United States Patent [19]

Rona

[11] 4,318,328
[45] Mar. 9, 1982

[54] REMOVABLE EXTERNAL PAYLOAD CARRIER FOR AIRCRAFT

[75] Inventor: Thomas P. Rona, Seattle, Wash.

[73] Assignee: The Boeing Company, Seattle, Wash.

[21] Appl. No.: 82,498

[22] Filed: Oct. 9, 1979

[51] Int. Cl.³ .............................................. F41F 3/06
[52] U.S. Cl. .................................. 89/1.815; 83/1 A; 89/1.5 H
[58] Field of Search .................. 89/1.815, 1.816, 1 A, 89/1.5 H, 1.5 R, 1.8–1.803, 1.05; 244/118.1, 137 R, 130

[56] References Cited

U.S. PATENT DOCUMENTS

| | | | |
|---|---|---|---|
| 1,115,457 | 10/1914 | Török | 244/30 |
| 2,342,022 | 2/1944 | Trimbach | 89/1.5 H |
| 2,646,786 | 7/1953 | Robertson | 89/1.5 C X |
| 2,731,885 | 1/1956 | Nolan | 89/1.815 |
| 2,741,159 | 4/1956 | Procos | 89/1.5 H |
| 2,900,874 | 8/1959 | Tjossem | 89/1.815 |
| 3,228,295 | 1/1966 | Kane et al. | 89/1.802 |
| 4,208,949 | 6/1980 | Boilsen | 89/1.815 X |

FOREIGN PATENT DOCUMENTS

| | | |
|---|---|---|
| 288711 | 7/1919 | Fed. Rep. of Germany . |
| 462571 | 11/1913 | France . |
| 311664 | 10/1933 | Italy . |
| 82932 | 3/1935 | Sweden . |

Primary Examiner—David H. Brown
Attorney, Agent, or Firm—Robert L. Gullette

[57] ABSTRACT

A carrier including one or more guide tracks, an endless positioning chain associated with each guide track for supporting a payload item, and one or more drive motors for moving the chains in unison with respect to the guide tracks to move a payload item toward an ejection station. A fairing may be mounted in association with the guide tracks. The guide tracks encircle the aircraft fuselage and are maintained under sufficient tension to apply a radial compressive force to the fuselage for securing them thereto. The guide tracks are laterally rigid but are flexible radially to conform to a range of fuselage contours when subjected to a tensile force. The guide tracks thus may be secured to different aircraft in order to temporarily transform the aircraft into a military payload carrier, with minimal modification. Following military employment, the aircraft may be refurbished for non-military usage by removal of the carrier. The carrier is particularly suited for reversibly converting an aircraft to a platform for carrying and launching one or more rockets or cruise missiles.

18 Claims, 17 Drawing Figures

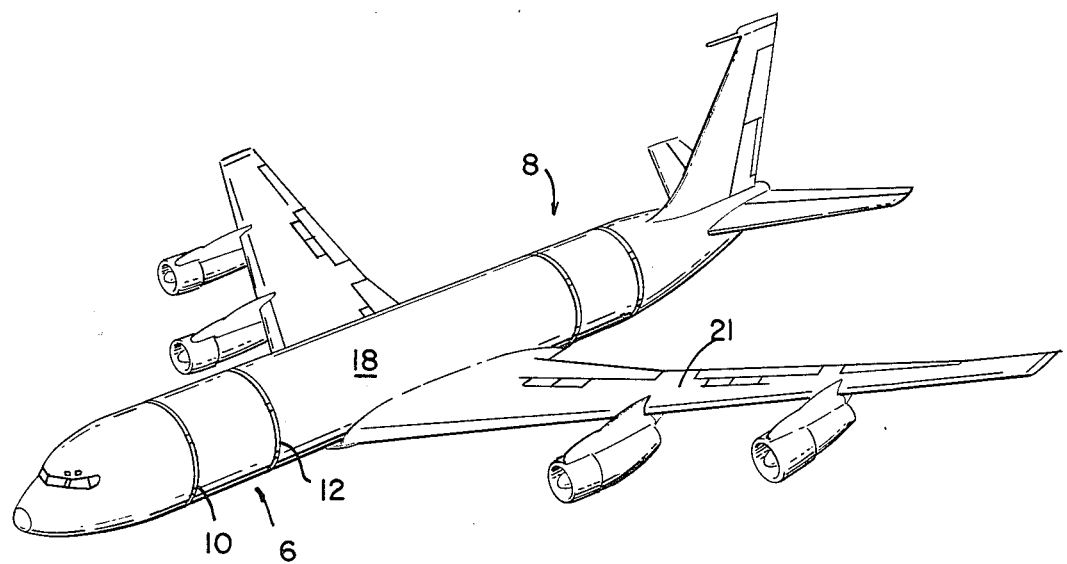
FIG. 1
FIG. 2
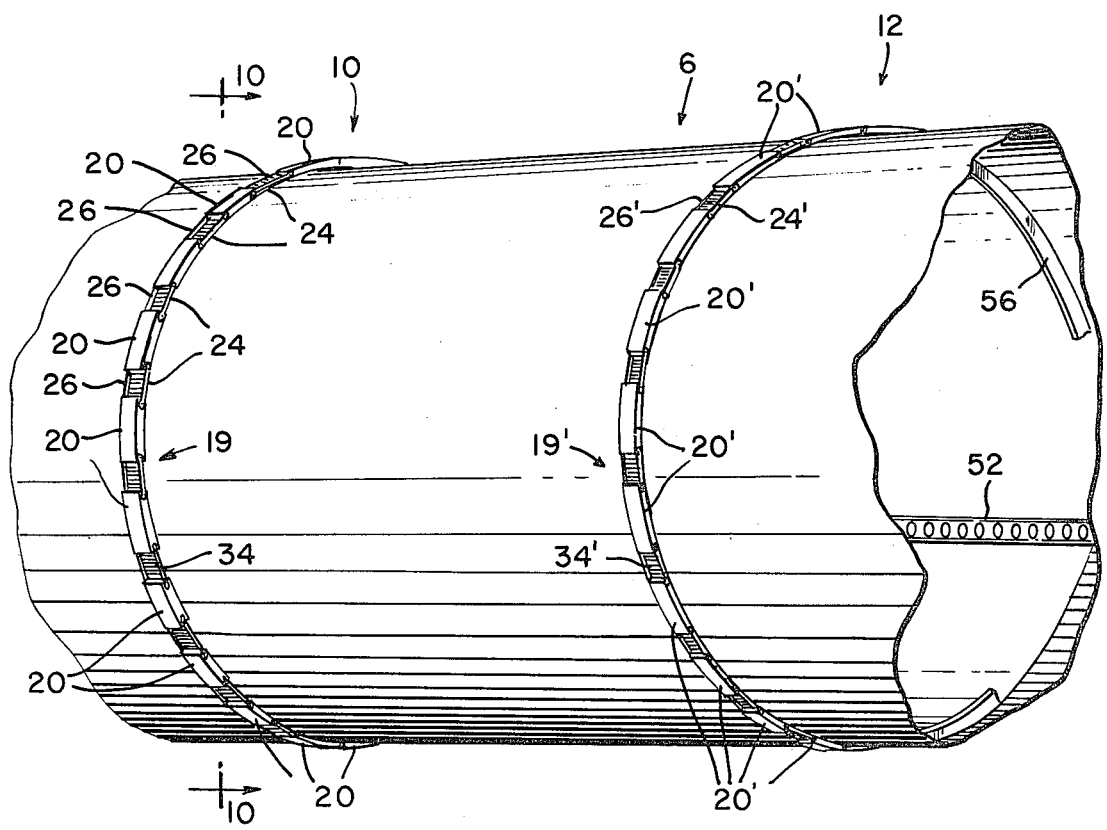

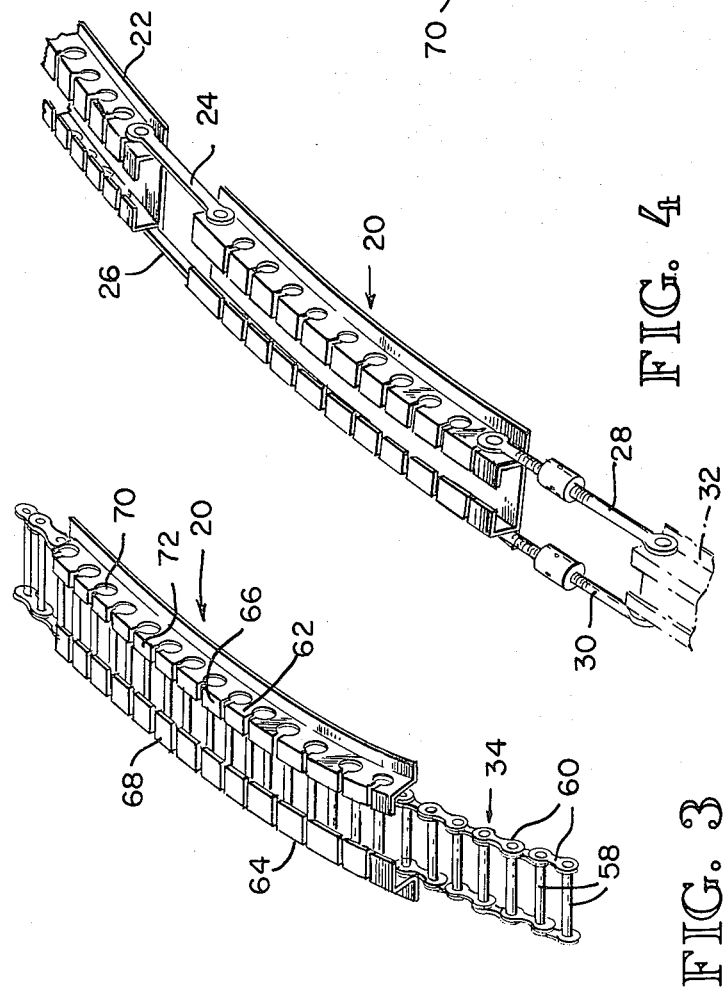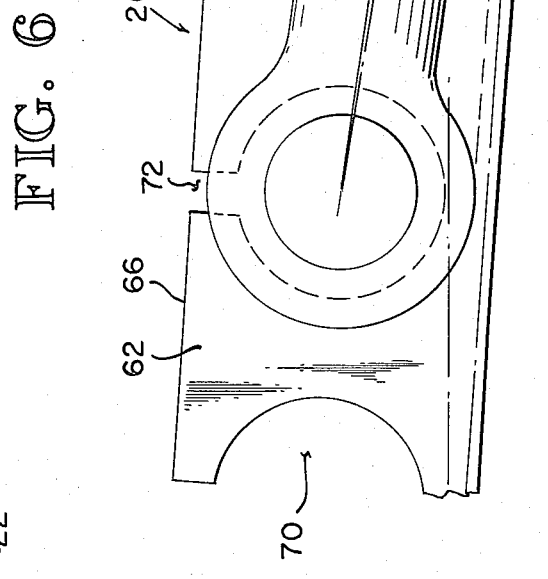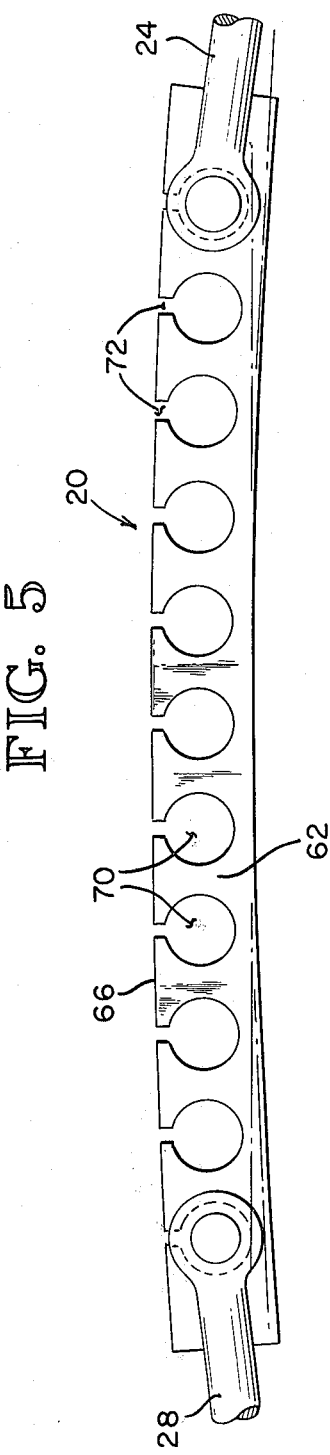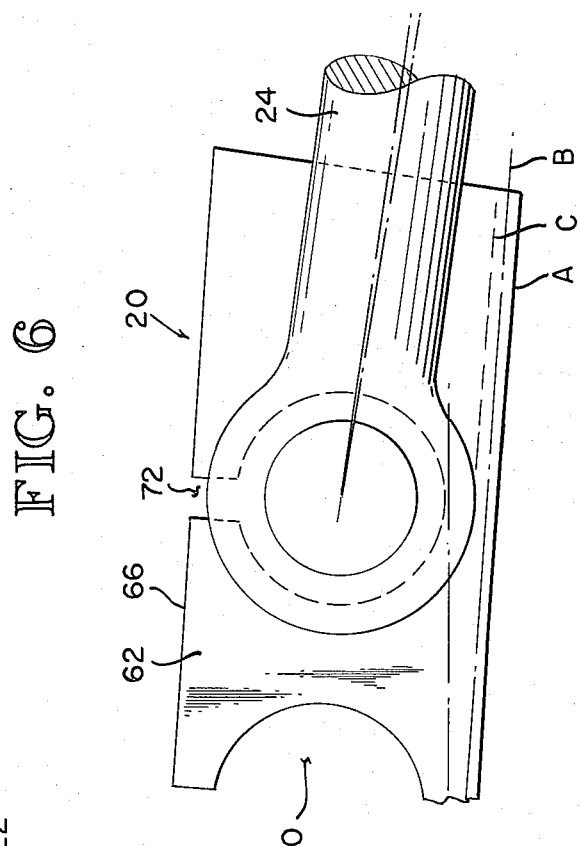

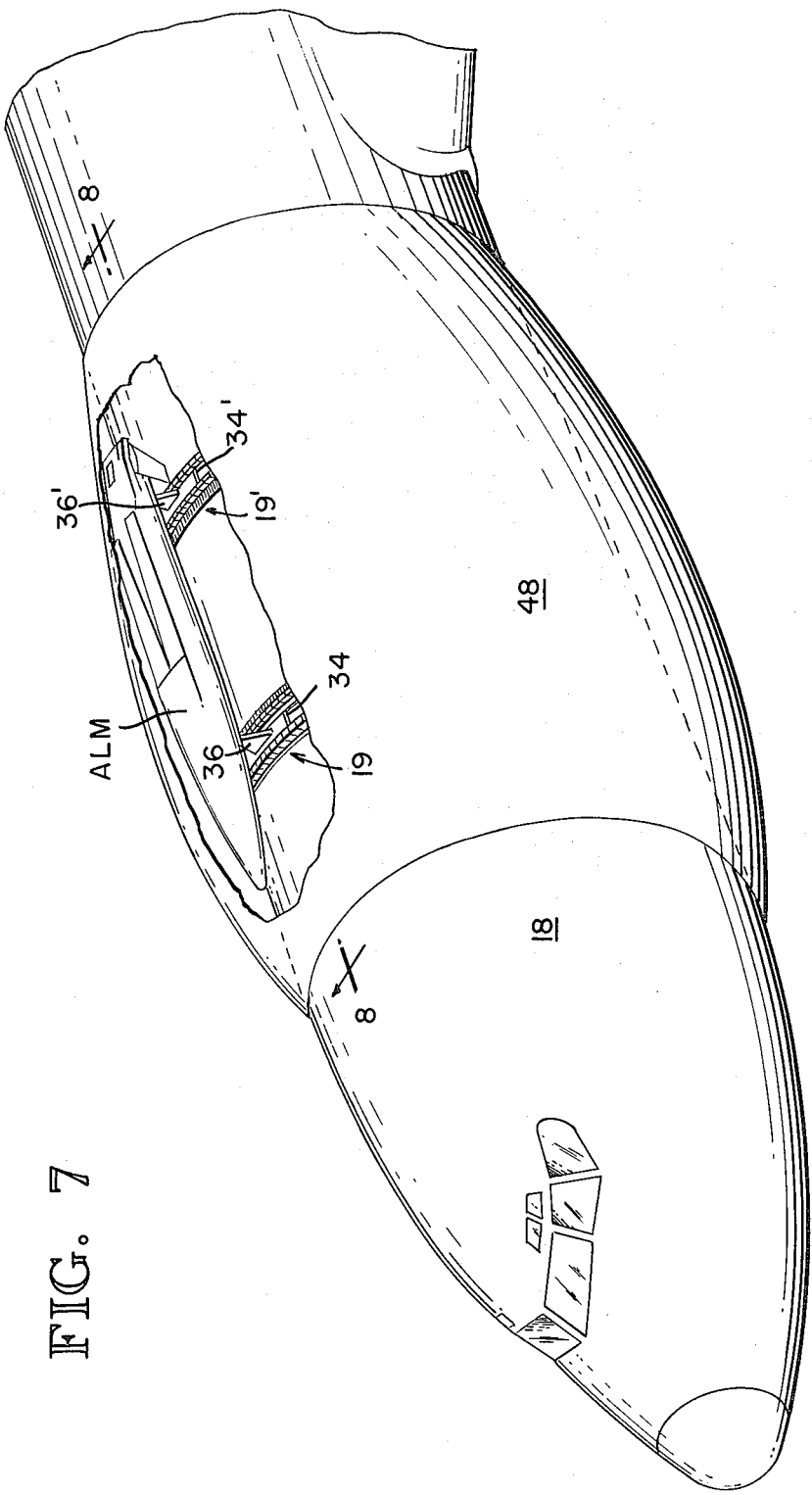

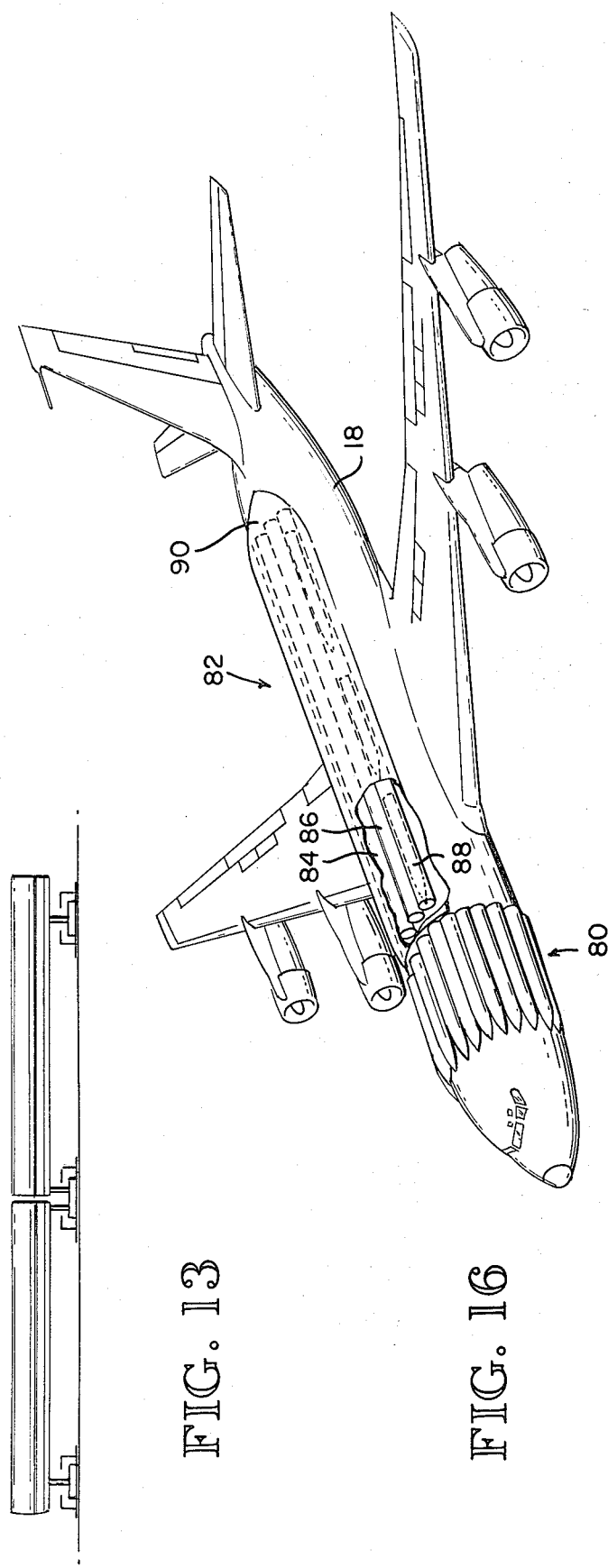
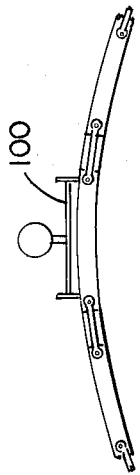
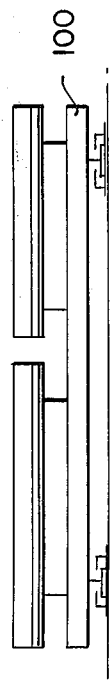
FIG. 13
FIG. 16
FIG. 12
FIG. 11

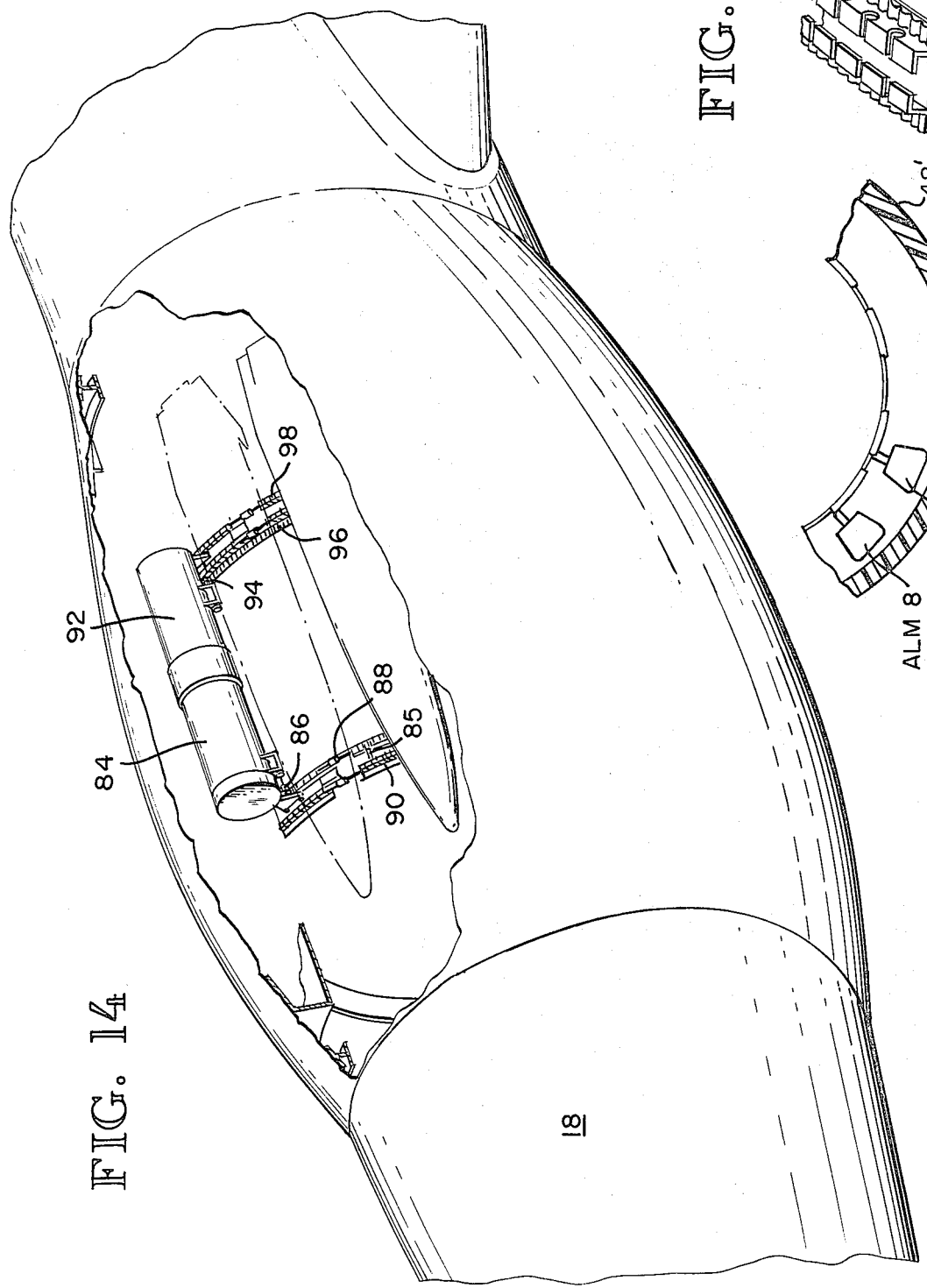
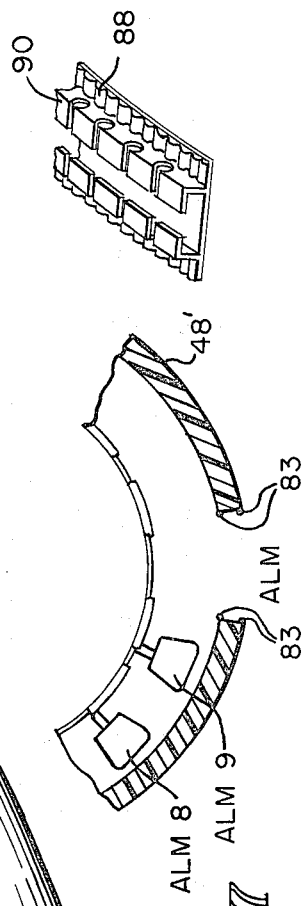

REMOVABLE EXTERNAL PAYLOAD CARRIER FOR AIRCRAFT

BACKGROUND OF THE INVENTION

This invention relates to payload or stores carriers for attachment to a vehicle. The carrier of this invention is particularly suited for usage with an aircraft as a carrier of one or more air-launched missiles, although it may be used with other military payloads including, but not limited to, air-launched or air-ejected missiles to be used in air-to-air or surface-to-surface combat operations, prepackaged missiles in cannisters for deployment over land or sea areas, deployable or dispersible electronic countermeasures equipment, sensor packages, miniaturized pilotless aircraft, rescue gear, replenishment supplies, and other logistics support equipment. It will be understood therefore that an air-launched missile (ALM) is disclosed herein as a particular payload item for illustrative purposes and that this invention may be used with all other payloads and carrier vehicles not explicitly mentioned herein.

The advent of ALM's has fostered the need for available aircraft capable of delivering one or more ALM's. Military aircraft, of course, offer a nucleus of available ALM carrier vehicles; however, it would be desirable to increase the number of available ALM carrier aircraft beyond military aircraft. To this end, non-military or commercial aircraft have been considered as possible ALM carriers, provided that these aircraft could be temporarily transformed into configurations suitable for military missions. (This temporary transformation is referred to hereinafter as "reversible conversion.") According to this reversible conversion concept, an aircraft designed and operated for commercial air transportation (passenger, freight, or combination) could be used as an ALM carrier without irreversible modification of its structure, avionics, or other essential elements. Likewise, a military aircraft originally not designed as an ALM carrier (e.g. patrol, surveillance, transport or tanker aircraft) could be used for this purpose, again without requiring irreversible modifications of its structure, avionics, or other essential elements. According to further aspects of this concept, the aircraft, following the temporary military use, can be essentially recovered in its original configuration without significant refurbishing, except for the possible damage suffered in the course of military operations. Following minimal refurbishment, it will have the same functional performance characteristics as prior to the military employment period.

Reversible conversion heretofore has not been practical because the converted aircraft configuration has been unsatisfactory from the standpoint of flight performance obtained or structural modification required. Some converted configurations typically create excessive drag, or impose additional stresses or fatigue on the aircraft above original design allowables. Other converted configurations require excessive structural modification. These converted configurations may be characterized as internal carry and external carry.

In the internal carry configuration, it is in general required to reinforce the floor in which the payload will be carried and to modify the cargo doors or other exit openings through which it can be loaded on the ground and discharged in flight. Missiles preferably should be launched with their longitudinal axis along the direction of flight. This through the currently existing openings in commercial passenger aircraft is just about impossible. Launching in other than this preferred orientation causes serious stress and flight dynamic problems in the inflight ejection operation. Reinforcement of the loading floor and structural modifications of the launch openings are in general expensive, not only in terms of direct cost but also owing to the duration of modifications which take the airplane out of commercial service with the concomitant loss of revenue. The additional reinforcement results in permanent payload penalty over extended peacetime periods before the actual military use (possibly as long as the operational life of the aircraft), the user is thus forced to suffer the corresponding revenue loss. This in turn calls for undesirable reimbursement via direct payments or privileges through regulatory decisions.

In the external carry configuration, payload packages such as missiles or cannisters are attached to the outside of the aircraft. In this instance, of course, drag and aero-elastic stability problems become important considerations. In general, structural modifications are required to provide the hard point or mounting posts upon which the load can be attached. Drag can be avoided by providing appropriate fairings; but with current designs (usually referred to as conformal carriages), such fairings must also be attached to the structural strong points of the aircraft. Once again, structural modifications to the extent that they cause payload penalty and availability loss are undesirable as explained above. Another form of external carry makes use of a rotary rack, such as that used in military aircraft, mounted in an aerodynamically shaped pod to be carried on a single strong-point built in one of the wings of certain commercial aircraft. (The original design purpose of the strong-point was to carry a spare engine.) The military payload that can be carried under such conditions, however, is of limited weight.

SUMMARY OF THE INVENTION

This invention provides a carrier adapted for an external carry configuration wherein one or more ALM's may be carried by an aircraft which is reversibly converted for military usage. As a consequence, any aircraft of appropriate payload capacity may, using this invention, be reversibly converted into a military payload or ALM carrier yielding acceptable flight performance, with minimal structural modification. Following military operation, the aircraft may be refurbished for non-military use. This invention therefore offers to make a nation's commercial airline fleet, military transport aircraft, and other available aircraft as military payload carriers, especially as ALM carriers. The invention also offers the possibility of converting military aircraft, designed for other uses, to ALM carriers, in a reversible mode.

According to one preferred embodiment of the invention, the carrier includes one or more conformable guide tracks which are secured under tension to the aircraft fuselage at spaced apart locations along the length thereof. An endless flexible positioning chain is mounted inside of each track and is freely movable about the periphery of the fuselage irrespective of the exact shape of the fuselage in cross-section or of deformations therein under flight loads. The positioning chains are motor driven and so positionable that payload packages attached thereto can be moved in sequential or arbitrarily chosen order from any initial position along the fuselage periphery into the ejection (launch) position(s). For ALM application, multiple missiles are carried about the fuselage periphery in parallel alignment with the longitudinal axis of the fuselage and are supported at their ends by two spaced apart guide tracks and associated positioning chains. A permanent or jettisonable fairing surrounds the carrier to ensure relatively modest additional drag caused by the additional payload. Excessive structural loads can be absorbed, if necessary, by internal bracing of the fuselage. According to further aspects of the invention for ALM application in particular, additional ALM's may be carried in externally affixed channels or tracks for reloading. If the size of the missiles permit, internally carried missiles could be loaded into the external channels by a transfer device installed in the cargo door.

These and other features, objects, and advantages of the present invention will become apparent from the detailed description and claims to follow, taken in conjunction with the accompanying drawings in which like parts bear like reference numerals.

BRIEF DESCRIPTION OF THE DRAWINGS

FIG. 1 is a perspective of an aircraft equipped with two carriers according to this invention, the carriers mounted fore and aft of the wing;

FIG. 2 is a fragmentary perspective of the forward FIG. 1 carrier;

FIG. 3 is a perspective of one guide track section and associated positioning chain of the FIG. 2 carrier;

FIG. 4 is a perspective of the FIG. 3 guide track;

FIG. 5 is a side elevation of the FIG. 4 guide track;

FIG. 6 is a side elevation generally similar to FIG. 5 but on expanded scale of one end of the guide track in different positions;

FIG. 7 is a perspective of the FIG. 1 forward carrier with a fairing and supporting an ALM payload;

FIG. 11 is a side elevation of a modified payload support;

FIG. 12 is an end elevation of the FIG. 11 support;

FIG. 13 is a side elevation of a second modified payload support;

FIG. 14 is a perspective generally similar to FIG. 7 of a modified chain drive assembly;

FIG. 15 is a fragmentary perspective on enlarged scale of the guide track of the FIG. 14 assembly;

FIG. 16 is a perspective generally similar to FIG. 1 of an aircraft equipped with a single carrier (fairing not shown for clarity) and a reloading assembly;

FIG. 17 is a fragmentary section generally similar to FIG. 9 of the forward carrier with an expendable fairing, depicting the fairing with a portion removed to permit launch of an ALM.

DETAILED DESCRIPTION OF THE DRAWINGS

Figure 8:
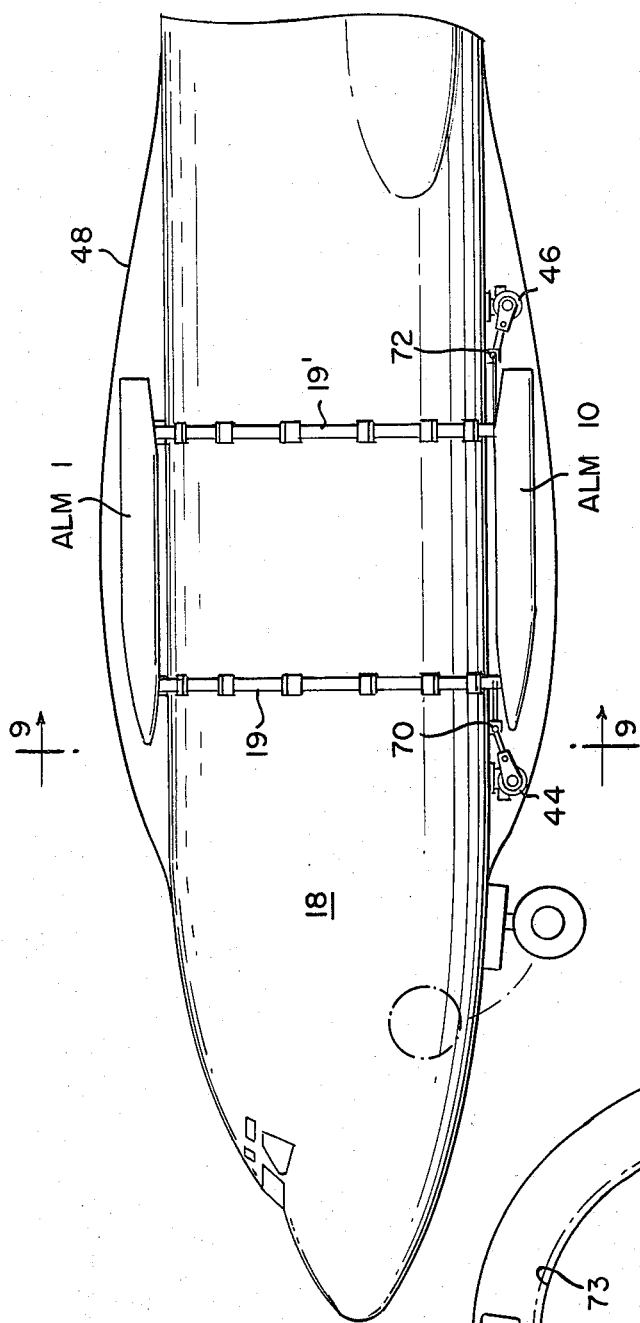
FIG. 8 is a section taken along the line 8—8 in FIG. 7.

Referring to FIG. 1 of the drawings, a jet transport aircraft may be equipped with one or more carriers of this invention to reversibly convert that aircraft into an ALM carrier. In the example illustrated in FIG. 1, two carriers 6 and 8 are detachably mounted on the aircraft fuselage 18 fore and aft of wing 21, respectively. FIG. 16 depicts a similar aircraft equipped with a single forward carrier and a dorsally located reloading assembly, to be described presently. The FIG. 1 carriers 6 and 8 are essentially identical and therefore only carrier 6 is described in detail hereinafter.

Referring now to FIGS. 1 and 2, carrier 6 includes a pair of parallel endless conveyor assemblies 10 and 12 which are spaced apart along the length of fuselage 18 a distance corresponding to the length of an ALM. These conveyor assemblies extend about the periphery of fuselage 18 in transverse alignment with the longitudinal axis thereof. Assemblies 10 and 12 are identical and therefore only assembly 10 is described in detail hereinafter, like parts of assembly 12 being designated with the same reference numerals, primed.

Referring now to conveyor assembly 10 as illustrated in FIGS. 2-6, conveyor assembly 10 is made up of a sectional guide track (generally referenced 19) which supports and guides an endless positioning chain 34 of length sufficient to encircle fuselage 18. Chain 34 is moved with respect to track 19 by a positioning motor 44, to be described presently. Track 19 is composed of a plurality of elongated guide track sections 20 which are secured end-to-end by connecting links 24, 26 and contractable couplings 28, 30. Couplings 28, 30 are contractable so as to exert a tensile force on sections 20 to apply a compressive radial force about the periphery of the fuselage 18 for maintaining track 19 in an operative conformal position, as illustrated in FIG. 2. (The track sections will be described in more detail hereinafter.)

Referring to FIG. 3, chain 34 is made up of multiple elongated load bearing elements 58 which are connected together at their ends by articulated links 60. The guide track sections guide the chain along a curved channel in which the chain is confined laterally but is freely movable in a circumferential direction. To this end, track section 20 includes upstanding sidewalls 62, 64 which terminate in lips 66, 68. These lips overlap the edges of the chain 34 and serve to retain it within the channel. The chain, of course, is unrestrained as it travels between the ends of adjacent track sections as illustrated in FIG. 2; however, it possesses sufficient lateral rigidity that it does not tend to become misaligned during these intervals of travel.

An important aspect of this invention is that the guide track sections are conformable to a range of fuselage contours. That is, the guide track sections are sufficiently flexible that they will conform to the contour of the underlying portion of the aircraft fuselage. As a consequence, the guide track sections may be applied to the aircraft fuselage at different locations which exhibit varying curvatures and may be applied to different aircraft. Furthermore, the guide track sections are sufficiently flexible to enable the fuselage shape to change in flight under the effect of flight stresses without creating excessive local stress concentrations. To this end, the track section includes side openings 70 of C-shaped outline which are formed in the sidewalls 62, 64 and terminate in slots 72 which extend transversely of lips 66, 68. Slots 72 are of sufficient width that, with the track section positioned with openings 70 facing outwardly from the fuselage, the track section can flex radially to assume a range of curvatures. The track section obtained is thus rigid with respect to longitudinal and lateral forces, but is flexible with respect to radial forces. Referring to FIG. 6, a typical track section is illustrated in three load conditions: free-standing (referenced A) wherein it presents its smallest radius of curvature, under essentially no-load conditions; nominal (referenced B) wherein it is forced to conform to the nominal fuselage radius of curvature, shown here as slightly larger than in A; and maximum radius of curvature (referenced C) wherein it is subjected to the maximum flexural load in the plane of the conveyor assembly 10. With this construction, the track section will assume a radius of curvature which conforms to the radius of curvature of the underlying portion of the fuselage when the track section is subjected to an appropriate tensile force applied along its length. The guide track section is composed of an appropriate material, such as aluminum, having desired flexural and load bearing properties.

Thus, it is possible, by applying sufficient tensile force to the interconnected track sections using couplings 28 and 30, to grip the exterior of the fuselage 18 so as to generate sufficient friction forces to prevent relative motion of guide track 19 with respect to the fuselage, both in the axial and the peripheral directions. If, however, this condition is not satisfied; that is, if the contact forces are insufficient to ensure the absence of such relative motion under conditions of allowable circumferential forces, semi-permanent adhesive material 73 could be applied between the inside track surface and the fuselage skin. The effect of this adhesive is to increase, by a substantial factor, the contact or gripping forces between the guide track and the fuselage skin. For an equivalent magnitude of contact forces, this would allow the reduction of the hoop (circumferential) tension and thereby the the radial compressive force applied to the fuselage. The adhesive should be preferably semi-permanent so that following the completion of military missions, the guide track could be removable by application of relatively small separation forces. Thereafter, the adhesive can be sanded or cleaned off so as to restore the original condition of the fuselage.

Figure 10:
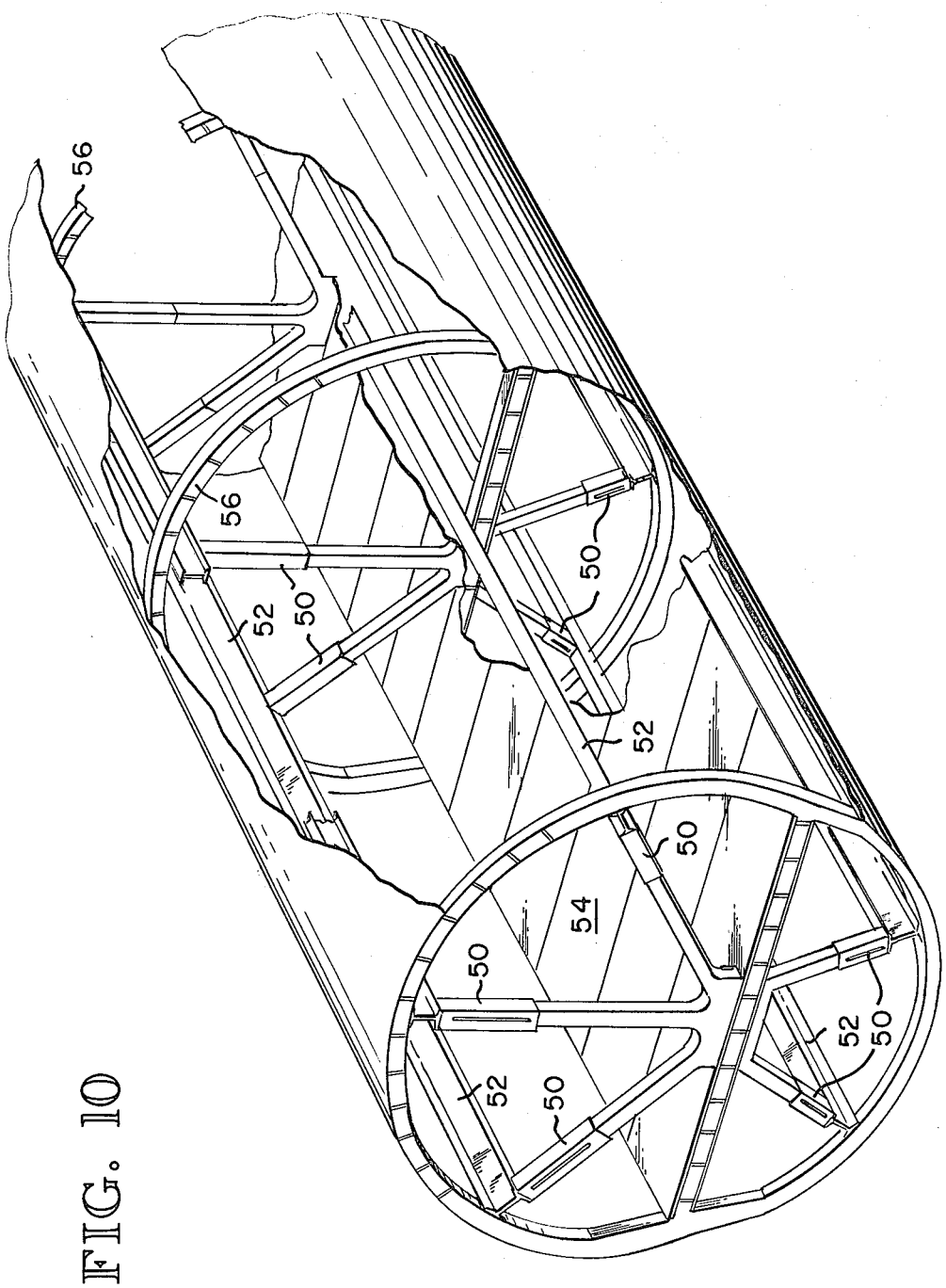
FIG. 10 is a section taken along the line 10—10 in FIG. 2.

It may be required to reinforce the fuselage internally against the additional static loads imposed by the aforementioned radial compressive forces and dynamic loads resulting from the gravity and inertial forces acting upon the payload packages and other components forming part of the conveyor assembly. Referring to FIG. 10, expandable radial braces 50 may be connected between longitudinal bracing beams 52 and the aircraft floor structure 54, so as to offer additional support against radial loads without causing excessive forces to act on the floor structure. Additional circumferential supports 56 also could be mounted by beams 52, as shown. In most practical ALM carrier applications, such reinforcement should not be required. If used, however, the reinforcement should be configured in such a manner as to permit assembly, tensioning, disassembly, and disposal of the payload carrier without modification of the primary aircraft structure.

Figure 9:
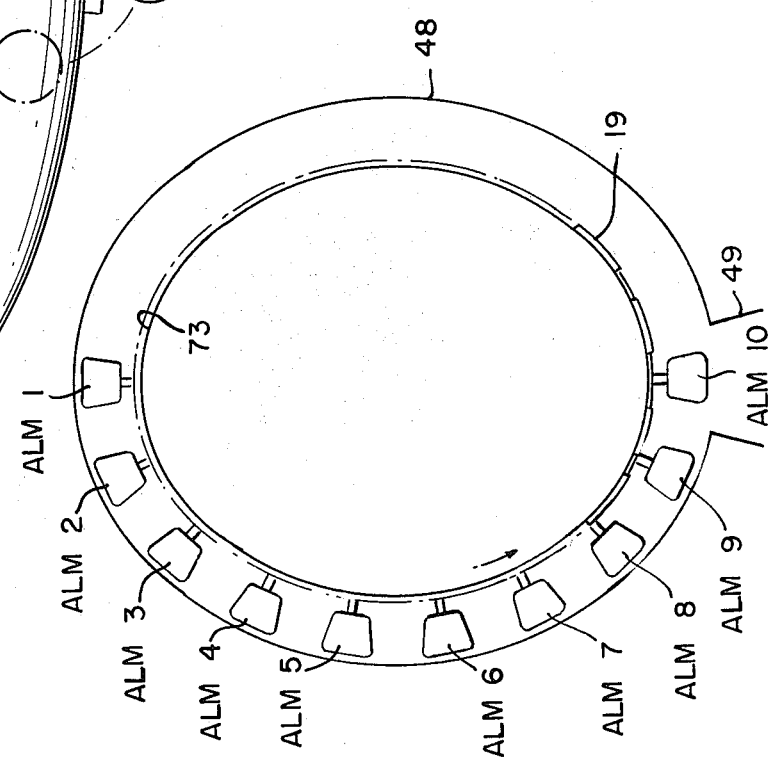
FIG. 9 is a section taken along the line 9—9 in FIG. 8.

Referring now to FIGS. 7-9, tracks 19 and 19' and respectively associated positioning chains 34 and 34' are mounted onto the exterior of fuselage 18 for supporting the ends of an ALM. Supports 36 and 36' are assembled to chains 34 and 34', respectively, for supporting the ends of the ALM. As an ALM carrier of multiple ALM's as depicted in FIGS. 8 and 9, multiple ALM's (ALM 1-10) are carried in parallel alignment with the longitudinal axis of fuselage 18. Individual drive motors 44, 46 are connected to and drive these chains in unison. In the example, these motors are electrically powered and are connected by respective power transmissions 70, 72 to chains 19 and 19'. In operation, these motors move the chains in unison a predetermined distance and maintain the chains at a selected index position. The motors may move the chains bi-directionally, or continuously, to present a selected ALM or other payload item at an ejection station which, in the example, is located adjacent the underside or belly of fuselage 18. (ALM 10 is located at the ejection station in FIG. 9.)

The ALM is ejected by releasing it from supports 36, 36' and allowing it to drop away from the aircraft. An appropriate ejection device could be used to apply a force to the ALM for initially separating it from the aircraft. Thus, the ALM's may be ejected in a predetermined sequence, or a selected ALM may be ejected out-of-sequence, as the case may be. By controlling release of the ALM occupying the ejection station, of course, it would be possible to move an ALM past the ejection station, which thereafter may be occupied by a succeeding ALM or other payload item. The former ALM, of course, could be returned to the ejection station at a later time by reverse movement.

A fairing 48 may be mounted by the tracks 19 and 19' and provides an aerodynamically shaped shell type surface surrounding the ALM's, as depicted in FIGS. 7-9. As illustrated in FIG. 9, fairing 48 includes ejection doors 49 at the ejection station. These doors are opened to eject an ALM.

To convert a commercial aircraft to an ALM carrier, the guide track sections are secured snugly around the outer surface of the aircraft fuselage at appropriate locations and are subjected to sufficient tensioning effort that frictional gripping forces will be applied to the aircraft skin. Once the tracks are in position, the positioning chains are assembled in place. The positioning motor or motors are now mounted to the fuselage, together with appropriate hydraulic or electrical circuits and driving mechanisms(s) so that, upon receiving the appropriate command signal, the positioning chains will move in either direction or stop in a specified index position. The drive assembly is so designed that two or more positioning chains which belong to the same group of two or more conformable guide tracks retain their relative peripheral positions when driven by the positioning motors. The assembly comprising two or several movable positioning chains in the corresponding number of guide tracks is now ready to receive the payload packages, which for the purposes of this description are associated with roughly cylindrically-shaped missiles. The missile packages are now mounted to the positioning chains in position around the periphery of the fuselage. Following these assembly operations, the reversible conversion is complete and the aircraft is ready to undertake its millitary missions(s).

In typical military mission, the aircraft is flown to the launch area using its own navigation and communication equipment. The initialization messages to the missiles, i.e., the electronically conveyed signals to be stored in the missiles which give navigation and weapon arming and fusing information, are generated by the proper military command and control system electronics communication equipment. The initialization is stored either directly in the missiles or auxiliary interface equipment on board the aircraft. The latter may be lodged in removable pallets, loaded and connected to the payload prior to take-off. The launch commands are then generated by the military command and control system and are either relayed directly to the missiles via the onboard communications equipment, or prestored in the aircraft and released via an enabling launch message sent to the aircraft personnel which in turn will generate the actual launch commands. The missile to be launched is so positioned that it faces the ejection door, the missile is launched and the operation is repeated until such time as the entire carrier is empty or the mission orders are modified. Following the missile launch, the aircraft returns to its original base or to an alternate base and is either reloaded or refurbished. If for some reason the missiles are not launched, they are returned to the home base or jettisoned in flight.

Referring again to FIG. 7, fairing 48 reduces drag at the expense of additional weight and cost. For long-range missions, such as transatlantic ranges for example, the drag reduction offered by the fairings is often found mandatory. For much shorter ranges or when aerial refueling is possible, the need for reducing drag is much less imperative. It is thus possible, for those missions less sensitive to drag, to eliminate fairing entirely, or shape the guide tracks in a manner which offers some measure of aerodynamically desirable profile in the longitudinal direction.

Referring to FIG. 17, an expandable fairing 48' also could be used in place of a track mounted fairing 48. In this instance, after assembly of the payload packages to the positioning chains, the interstices between the ALM's and the fuselage as well as the spaces between the ALM's could be filled with lightweight, fast-curing material, such as urethane foam, for example. The external surface of this material could be molded in the desirable aerodynamic shape and coated externally with smooth paint or similar material and formed to rupture upon ejection of any one of the ALM's. This rupture would occur in the entirety of the molded fairing when the ALM is ejected, or along mechanically weakened fault lines which cause fracture of the molding portion associated with any one or several missiles. Electrical wires 83 could be embedded in the molded fairing, as depicted in FIG. 17, to produce fracture along predetermined internal surfaces following the passage of current in these wires when fracture is desired. In the illustrated example, a portion of fairing 48' has been fractured and removed during ejection of ALM 10 (not shown), with fracture having occurred along parallel fault lines formed by wires 83. In the expendable fairing, of course it is essential that: prior to, and following partial launch of missiles, the relative motion of the ALM's in the peripheral direction under the action of the positioning motors must not perceptibly interact with the aircraft or missile motions and structures; and following partial or complete launch of the missiles, the then remaining portion of the molded fairing does not significantly degrade the theretofore experienced drag performance.

A modified drive assembly is illustrated in FIGS. 14 and 15. In this assembly, a motor is essentially installed in the place of one payload package and is mounted on positioning chain 34. A suitable reduction gear train 86 transmits power from motor 84 to a fixed rack 88 which forms part of a conformable guide track 90 (see FIG. 15). A motor 92, gear train 84, and rack 96 are associated with parallel guide track 98. These motors are operated in unison to exert forces on racks 88 and 96 to drive the positioning chains with respect to their respective guide tracks.

Referring to FIGS. 11 and 12, when the payload packages are relatively short, more than two guide tracks may be employed under the same fairing. The design choice is to use either two chain tracks with the payload packages such as ALM's mounted on an auxiliary stiffening structure 100 as depicted in FIGS. 11 and 12, or to use more than two tracks, with the intermediary track serving both missiles assembled along the same generatrix of the fuselage as depicted in FIG. 3. The concept can be expanded to cover combinations of the above in order to serve more than two missiles mounted along the same generatrix. Whatever the number of guide tracks serving a given carrier, of course, the positioning motors must be mechanically or electrically synchronized so that in the course of peripheral motion of the positioning chains, the relative position of all missiles will be preserved.

Referring to FIG. 16, a single forward carrier (referenced 80) may be reloaded with fresh ALM's carried externally to the fuselage 18. To this end, external tubes, tracks or channels are installed along any one or several of the fuselage generatrix lines. These channels or loading tracks may be used to store, and upon proper command to displace in the axial direction, missiles or other payload packages similar in nature and shape to those described hereinabove. An exemplary assemblage of loading tracks, displacement mechanisms, payload packages and aerodynamic fairing surfaces as a dorsal loading structure 82 installed on the upper lateral surface of the fuselage is illustrated in FIG. 16. In the example, structure 82 includes three parallel tubes 84, 86, 88 which terminate at their front ends in coaxial alignment with three adjacent index positions of carrier 80. A dorsal fairing 90 is mounted on the fuselage.

Once the missiles or other payload packages have been launched from the carrier 80, the missiles or payload packages stored in the dorsal loading structure 82 are moved forwardly in the axial direction via tubes 84, 86, 88 to effect reload. The positioning chains are for this purpose stopped in the position required to accept one, two, or three fresh missiles from tubes 84, 86, 88. Following acceptance of three fresh missiles, the chains are rotated to advance three index positions for additional reloading. This loading operation is repeated until all ALM positions are occupied by fresh missiles or until the reload missile supply is exhausted.

For use with aircraft equipped with a forward cargo door, a single carrier could be mounted by the aft portion of the fuselage as illustrated by carrier 8 in FIG. 1. To reload this carrier, missiles or payload packages are transferred to the carrier 8 from inside the aircraft via the cargo door and then rearwardly along an external loading track generally similar to structure 82. In this case, carrier 8 need not include a fairing and the loading track requires a minimal fairing. Carrier 8 remains empty until the aircraft approaches a delivery location, at which time the carrier is loaded.

To maintain in-flight balance when only a single forward carrier is used, either reserve fuel or movable ballast should be loaded in the aft portion of the fuselage and repositioned automatically as the missiles are expended. Some inert ballast will be required to ensure proper balance in the case where the fuel reserve is exhausted and the airplane must return to base without having launched its missiles. Similar balancing techniques, of course, may be used when only a single aft carrier is used.

Although one preferred embodiment of the invention has been illustrated and described herein, variations will become apparent to one of ordinary skill in the art. Accordingly, the invention is not to be limited to the specific embodiment illustrated and described herein, and the true scope and spirit of the invention are to be determined by reference to the appended claims.

I claim:

1. A payload carrier for detachable mounting on selected vehicles having bodies which are of cross-sectional outlines within a predetermined range of outlines, the carrier comprising: guide means engagable with the exterior of a vehicle body about the periphery thereof; and payload positioning means operatively associated with said guide means for movement with respect thereto to move a payload article with respect to the body periphery toward a payload ejection station at which the payload article may be released; said guide means including means conformable to the cross-sectional outline of the body for applying a compressive force about the body periphery to maintain said guide means in a fixed position thereon.

2. The carrier of claim 1, wherein said guide means include a conveyor assembly made up of guide track means adapted to encircle the body and wherein said payload positioning means include an endless chain which is guided by said guide track means for movement with respect to the body periphery.

3. The carrier of claim 2, wherein said conveyor assembly includes means mounted by the vehicle and acting between the vehicle and said chain for moving said chain with respect to said guide track means.

4. The carrier of claim 2, wherein said conveyor assembly includes means mounted by said chain and acting between said chain and said guide track means for moving said chain with respect to said guide track means.

5. The carrier of claim 2, wherein said guide track means include a plurality of elongated guide track sections and means for securing said sections together in end-to-end relation under a tensile load sufficient to apply said compressive force.

6. The carrier of claim 5, wherein each said track section includes a continuous inner surface adapted to contact the body exterior, and lateral confinement means upstanding from said surface for confining said chain to move along a peripheral path, said confinement means including a plurality of openings spaced along the length of said track section to enable said track section to be curved so as to maintain said surface in conforming contact with the body exterior when said track section is subjected to said tensile load.

7. A removable external payload carrier for reversibly converting an aircraft to an ALM carrier aircraft, the carrier comprising: guide means engagable with the aircraft fuselage about the periphery thereof; and payload positioning means for supporting a plurality of ALM's in parallel alignment with the longitudinal axis of the fuselage and operatively associated with said guide means for movement with respect thereto to move an ALM with respect to the fuselage periphery toward an ejection station at which an ALM may be released; said guide means including means conformable to the cross-sectional outline of the fuselage for applying a compressive force about the fuselage periphery to maintain said guide means in a fixed position thereon.

8. The carrier of claim 7, including means mounted by the fuselage exterior for reloading said payload positioning means by positioning a fresh ALM for support thereby in a location for movement toward said ejection station.

9. The carrier of claim 7, including fairing means operatively associated with said guide means and said payload positioning means for surrounding the ALM's.

10. The carrier of claim 9, wherein said fairing means include an aerodynamic shell mounted by said guide means, said shell including an opening adjacent said ejection station, and door means for closing said opening until an ALM is to be released.

11. The carrier of claim 9, wherein said fairing means include material forming an aerodynamic surface, and means for removing a portion of said surface adjacent said ejection station when an ALM is to be released.

12. The carrier of claim 7 wherein said guide means include two conveyor assemblies each made up of guide track means adapted to encircle the fuselage and wherein said payload positioning means include an endless chain which is guided by said guide track means for movement with respect to the fuselage periphery, and means mounted by said chain for supporting the end of an ALM.

13. The carrier of claim 12, wherein said conveyor assembly includes means mounted on the fuselage and acting between the fuselage and said chain for moving said chain with respect to said guide track means.

14. The carrier of claim 12, wherein said conveyor or assembly includes means mounted by said chain in place of an ALM and acting between said chain and said guide track means for moving said chain with respect to said guide track means.

15. The carrier of claim 12, wherein said guide track means include a plurality of elongated guide track sections and means for securing said sections together in end-to-end relation under a tensile load sufficient to apply said compressive force.

16. The carrier of claim 15, wherein each said track section includes a continuous inner surface adapted to contact the fuselage exterior, and lateral confinement means upstanding from said surface for confining said chain to move along a peripheral path, said confinement means including a plurality of openings spaced along the length of said track section to enable said track section to be curved so as to maintain said surface in conforming contact with the fuselage exterior when said track section is subjected to said tensile load.

17. A method for converting an aircraft to an ALM carrier aircraft, comprising the steps of: securing guide track means to the aircraft fuselage about the periphery thereof essentially by applying a peripheral compressive force thereto; and mounting payload positioning means to said guide means for supporting a plurality of ALM's in parallel alignment with the longitudinal axis of the fuselage for movement with respect to the fuselage periphery toward an ejection station at which an ALM may be released, whereby the aircraft may be converted to an ALM carrier and may be refurbished to its prior condition with essentially no modification to the fuselage or the structure.

18. The method of claim 17, including applying a layer of adhesive to the aircraft fuselage for securing said guide track means thereto.

* * * * *